US008335783B2

(12) United States Patent
Milby

(10) Patent No.: US 8,335,783 B2
(45) Date of Patent: Dec. 18, 2012

(54) COLLECTION OF STATISTICS FOR SPATIAL COLUMNS OR R-TREE INDEXES

(75) Inventor: Gregory Howard Milby, San Marcos, CA (US)

(73) Assignee: Teradata US, Inc., Dayton, OH (US)

( * ) Notice: Subject to any disclaimer, the term of this patent is extended or adjusted under 35 U.S.C. 154(b) by 171 days.

(21) Appl. No.: 12/979,740

(22) Filed: Dec. 28, 2010

(65) Prior Publication Data

US 2012/0166423 A1   Jun. 28, 2012

(51) Int. Cl.
*G06F 17/30* (2006.01)
(52) U.S. Cl. .................... 707/718; 707/770; 701/409
(58) Field of Classification Search .......... 707/718–721, 707/770; 701/409
See application file for complete search history.

(56) References Cited

U.S. PATENT DOCUMENTS

| | | | |
|---|---|---|---|
| 6,252,605 B1 * | 6/2001 | Beesley et al. ............... 345/441 |
| 6,381,605 B1 * | 4/2002 | Kothuri et al. ........................ 1/1 |
| 6,505,205 B1 * | 1/2003 | Kothuri et al. ......... 707/999.001 |
| 6,732,107 B1 * | 5/2004 | Luo et al. ............... 707/999.001 |
| 7,769,733 B2 * | 8/2010 | Chen et al. .................... 707/702 |
| 8,214,371 B1 * | 7/2012 | Ramesh et al. ............... 707/743 |
| 2008/0120608 A1 | 5/2008 | Shetty et al. |
| 2009/0204367 A1 | 8/2009 | Hemmett et al. |
| 2009/0310823 A1 | 12/2009 | Cherng et al. |
| 2010/0229132 A1 | 9/2010 | Gu et al. |
| 2010/0281017 A1 * | 11/2010 | Hu et al. ...................... 707/718 |

OTHER PUBLICATIONS

Theodorinis et al. "A model for the prediction of R-tree performance", Proceeding PODS '96 Proceedings of the fifteenth ACM SIGACT-SIGMOD-SIGART symposium on Principles of database systems pp. 161-171 , 1996.*
Huang et al. "A Cost Model for Estimating the Performance of Spatial Joins Using R-trees", Proceeding SSDBM '97 Proceedings of the Ninth International Conference on Scientific and Statistical Database Management p. 30-38 IEEE Computer Society Washington, DC, USA 1997.*

* cited by examiner

*Primary Examiner* — Khanh Pham
(74) *Attorney, Agent, or Firm* — Schwegman, Lundberg & Woessner, P.A.

(57) ABSTRACT

Techniques for collecting statistics of column data or R-Tree indexes are provided. A distributed database system includes a plurality of processing nodes controlling portions of spatial data. The nodes are instructed to create minimum bounding rectangles (MBR's) for their spatial data or R-Trees. The individual MBR's are merged and reformatted into a grid of equally sized cells. Each processing node is provided a copy of the grid to update based on statistics of each processing node's spatial data for a target table. The updated grids are then merged into a single grid and used by an optimizer to evaluate queries before the queries are executed.

20 Claims, 8 Drawing Sheets

Spatial Statistics Context Block (SSCB)

RTREE Composition Statistics

Integer Number_RTREE_Levels
Integer Number_Directory_Blocks
Integer Total_Number_Directory_Rows
Integer Number_Leaf_Blocks
Integer Total_Number_Leaf_Rows

GeoGrid Population Statistics

Integer Number_Grids

| INT Grid# | MBR | INT Distinct_Count | INT Intersect_Count |
|---|---|---|---|
| INT Grid# | MBR | INT Distinct_Count | INT Intersect_Count |
| ... | ... | ... | ... |
| INT Grid# | MBR | INT Distinct_Count | INT Intersect_Count |

FIG. 1A

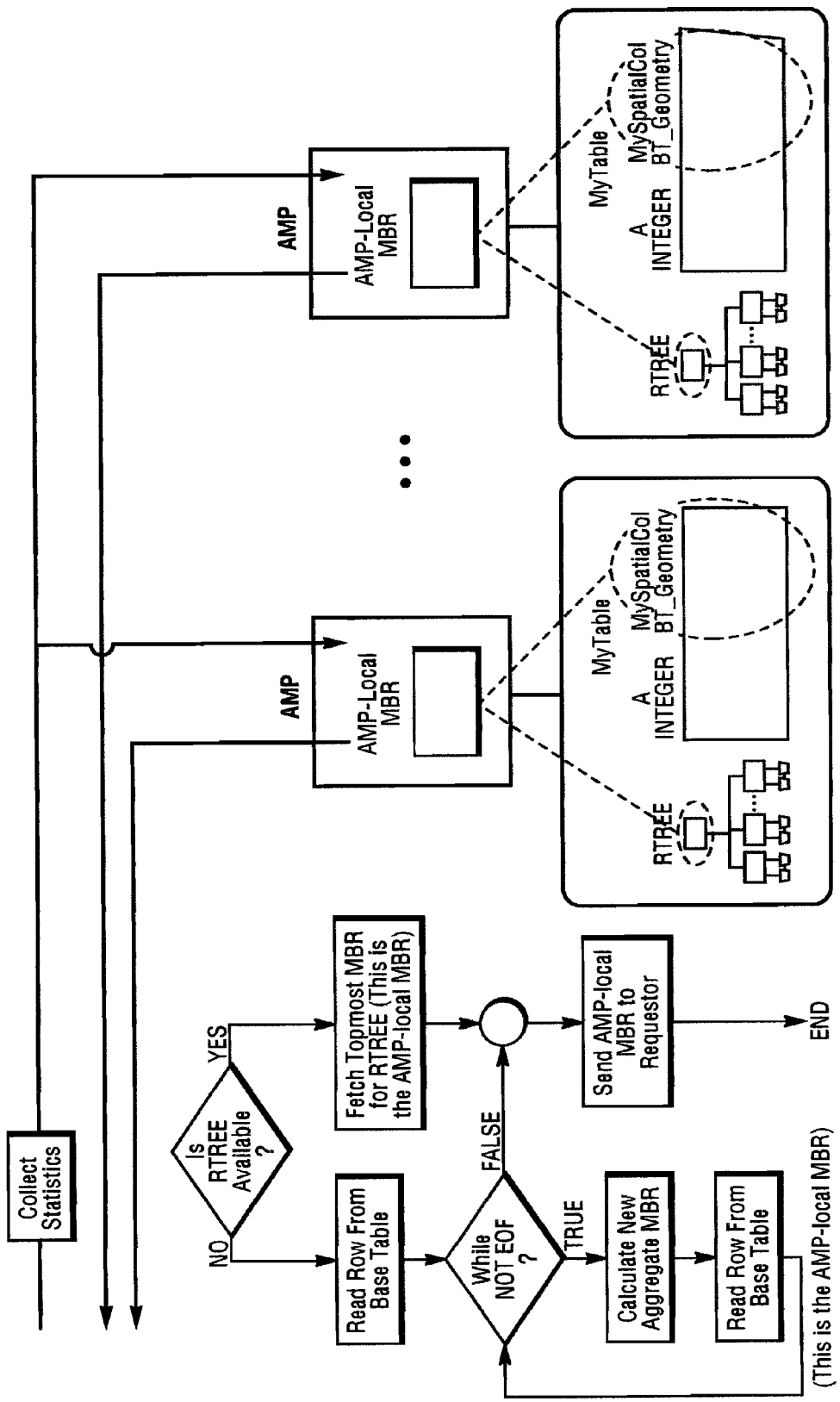

COLLECTION OF STATISTICS FOR SPATIAL COLUMNS OR R-TREE INDEXES

BACKGROUND

In a commercial database system, the optimizer component is responsible for picking the best strategy for solving a Structured Query Language (SQL) query. The optimizer typically does this by examining a number of possible search strategies, and then picking the strategy that can be executed in the shortest amount of time. A key ingredient that enables the optimizer to perform this task is the availability of statistics that help the optimizer understand the number of database rows, and underlying database storage blocks, which must be manipulated in order to resolve a given query.

Although the collection of statistics is not supported by any of the SQL standards, most Relational Database Management System (RDBMS) vendors include support for some form of statistical collection on the data stored within their databases. A RDBMS vendor specific Data Definition Language (DDL) is utilized as the mechanism by which a user instructs the database to gather statistics on a particular column of a relational table. The RDBMS logic analyzes the data values stored in the column to determine a frequency of occurrence for each value. The collected data is then transformed into some form, suitable for tracking data of that type. For example, for scalar data this information may be transformed into a histogram, storing the frequency of occurrence for the scope of the scalar data. Other forms of storing the frequency data are possible, depending upon the RDBMS vendor. This approach to collecting and storing statistics has worked well, because the principal data types up to recent history have all been scalar data types.

In addition to statistical collection, a commercial database is also provided with a database table column indexing mechanism that enables rows of the database to be retrieved more efficiently via a search condition executed against the table's indexed column. For scalar data, the index search key is usually the same scalar value as that found in the table's column being indexed. Armed with database indexes and statistics, the optimizer is thus able to select an optimal plan for solving an SQL query.

Recently, spatial data types were introduced into the American National Standards Institute (SQL) standard. Spatial data types are not scalar and represent for the most part multi-dimensional shapes: circles, squares, rectangles, polygons, etc. Unlike scalar SQL data types that mainly are concerned with relational operations such as: less than, greater than, equals, etc.; spatial data types have a large number of ANSI defined SQL operations that can be applied against them, such as: touches, intersects, overlaps, within, disjoint, crosses, distance, etc.; all of which must be executed in an efficient manner.

Spatial columns may also be indexed to improve overall retrieval performance. To support spatial indexing, one would typical need a specialized spatial construct such as a Minimum Bounding Rectangle (MBR) Tree-based index (R-Tree index). This index provides a mechanism by which spatial objects may be stored/retrieved while simultaneously maintaining the inter-spatial object relationships. An R-Tree approach is built around the concept of a MBR's. The MBR is used to decide where data is to be stored within the file system/index containing the spatial data.

The problem is how to collect statistics for spatial data residing within either a table column or an R-Tree index that can then be fed to the optimizer to enable it to select the best strategy for solving an SQL query containing spatial predicates and spatial join terms. The histogram model, though useful for scalar data types, is not applicable to the case of spatial data.

Therefore, a mechanism is needed that would enable the optimizer to predict how many database rows might be returned when a particular spatial operation is executed against a table.

SUMMARY

In various embodiments, techniques for collection of statistics of column data or R-Tree indexes are presented. According to an embodiment, a method for collecting statistics on an R-Tree index is provided.

Specifically, particular processing nodes are designated in a distributed database system. Each designated processing node forming a single minimum bounding rectangle of that designated processing node's MBR Tree (R-Tree) having spatial data. Then, the MBR's returned from each particular processing node are merged into a single system-wide MBR and the single system-wide MBR is reconfigured into equally sized cells. Next, a spatial statistical context block (SSCB) is created from the reconfigured system-wide MBR. Finally, the SSCB is broadcasted out to each of the particular processing nodes for population by each of the particular processing nodes with statistics for spatial data identified in each of the particular processing node's R-Tree.

BRIEF DESCRIPTION OF THE DRAWINGS

FIG. 1A is an example illustration for spatial statistics context block, according to an example embodiment.

FIG. 1B is an example illustration for phase one processing in collecting statistics for an R-Tree index associated with column data, according to an example embodiment.

DETAILED DESCRIPTION

FIG. 1A is an example illustration for spatial statistics context block, according to an example embodiment.

FIG. 1B is an example illustration for phase one processing in collecting statistics for an R-Tree index associated with column data, according to an example embodiment.

Figure 1C:
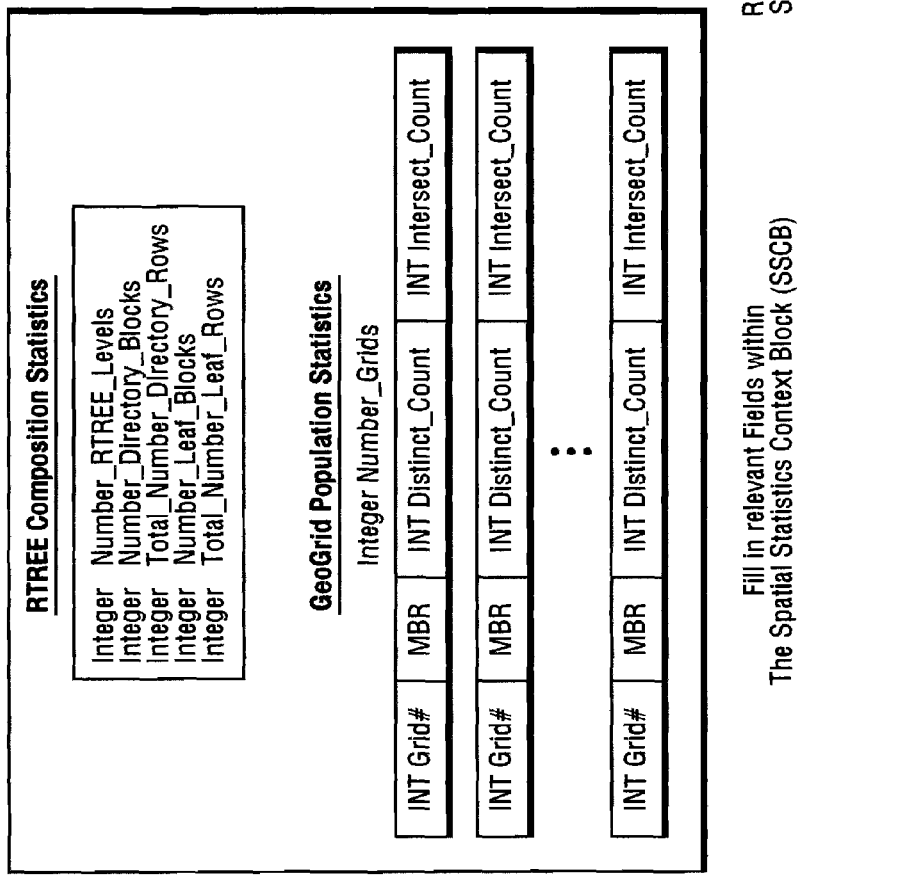
FIG. 1C is another example illustration for phase one processing in collecting statistics for an R-Tree index associated with column data, according to an example embodiment.
Figure 1C:
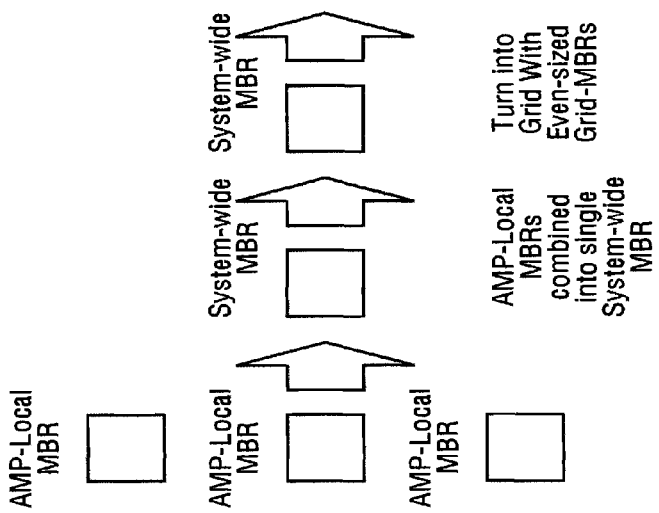

FIG. 1C is another example illustration for phase one processing in collecting statistics for an R-Tree index associated with column data, according to an example embodiment.

Figure 1D:
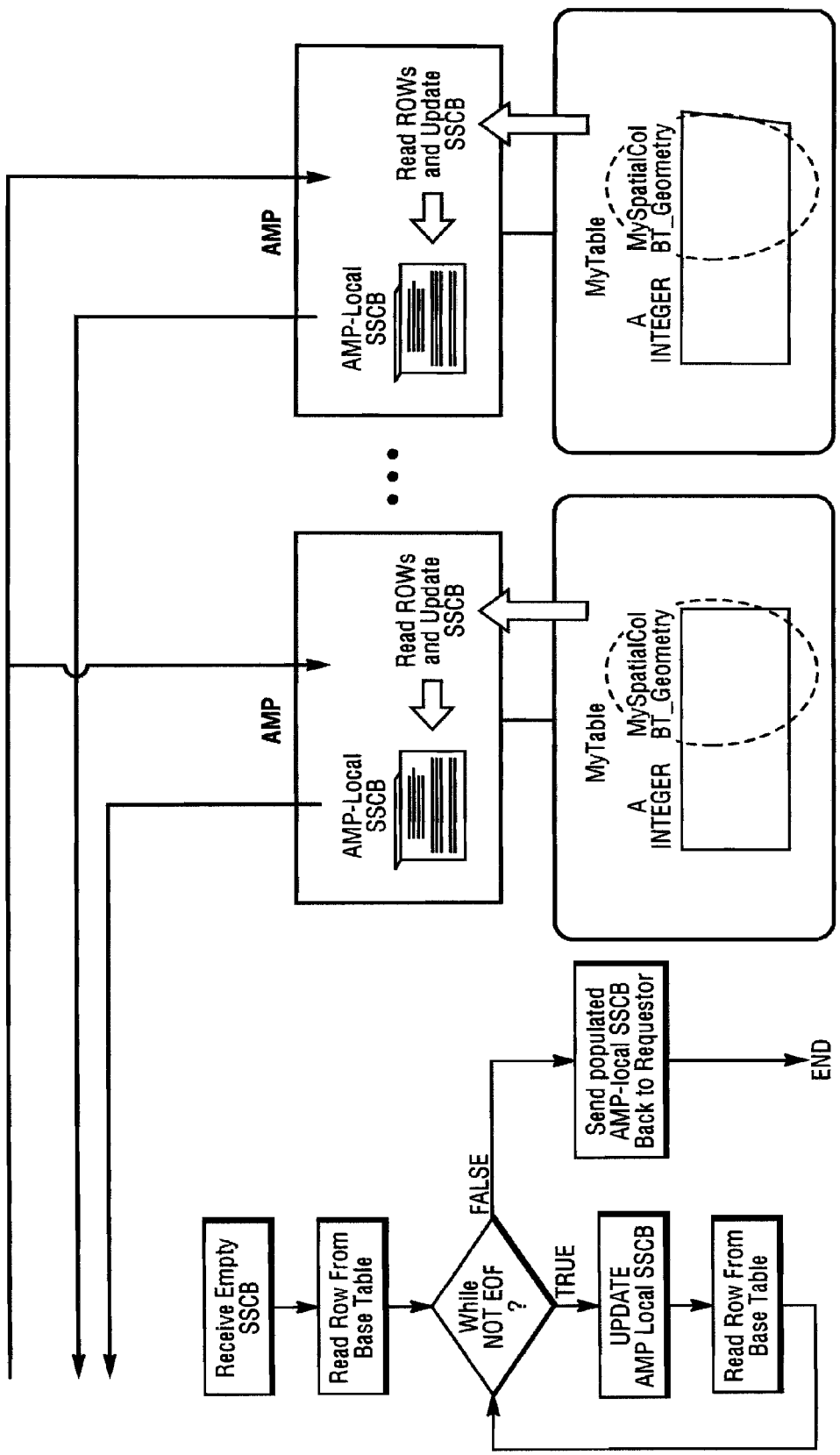
FIG. 1D is an example illustration for phase two processing in collecting statistics for an R-Tree index associated with column data, according to an example embodiment.

FIG. 1D is an example illustration for phase two processing in collecting statistics for an R-Tree index associated with column data, according to an example embodiment.

Figure 1E:
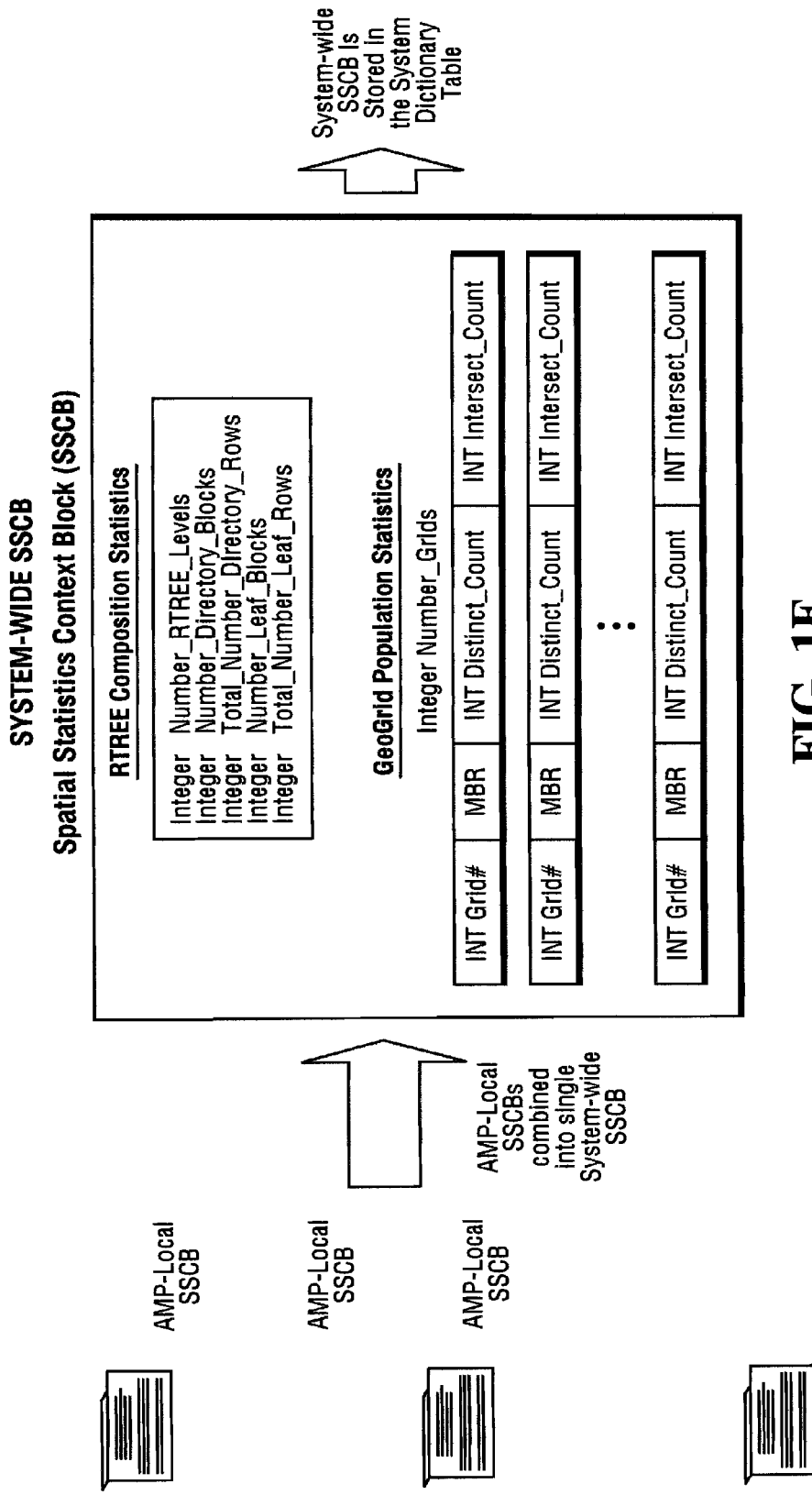
FIG. 1E is an example illustration for phase three processing in collecting statistics for an R-Tree index associated with column data, according to an example embodiment.

FIG. 1E is an example illustration for phase three processing in collecting statistics for an R-Tree index associated with column data, according to an example embodiment.

FIGS. 1A-1E are presented for reference with the discussion that follows.

Because large-scale commercial database systems are updated often and include voluminous data, some commercial database systems, such as Teradata® (distributed by Teradata, Inc.) systems use a parallel scalable database model in which the rows of a user table are distributed amongst execution units known as Access Module Processors (AMPs). To better understand this architecture, consider the following: Given a database configured with 100 AMPs and a SQL user's table containing 100,000 rows, an ideal distribution is to distribute the rows such that 1000 rows sit on each AMP. Distributing the rows in such a manner as this fosters an improvement in performance in that in solving a query that must examine all 100,000 rows; each AMP is only required to look at its 1000. Thus the query can be solved in $1/100^{th}$ the time that it would be solved had only 1 AMP worked on the data.

The collection of statistics for scalar data is typically driven by the issuance of a special DDL statement. For example, "COLLECT STATISTICS ON MyTable COLUMN MyScalarintegerCol" that instructs the RDBMS to collect statistics of the "MyScalarintegerCol" column in table "MyTable". Statistics are typically collected using a two phase approach, and then stored in the database dictionary (DD) in the form of a histogram. During phase 1, a message is broadcast to all AMPs. The message instructs each individual AMP to read rows from the target table and collect frequency of occurrence statistics on the target column. This local information, which is collected, is then stored in a special histogram context block. Once all AMPs have completed phase 1, then phase 2 of statistical collection can begin. In phase 2, the local histograms are all sent to one location, where then can be merged into a single histogram context block representing all the data in the system stored in the MyTable.MyScalarintegerCol column. This system-wide histogram is then stored away in the DD.

Now for illustration and example is presented demonstrating how an optimizer uses scalar statistics. As an example consider that the optimizer wants to calculate the number of rows remaining in a particular table after some predicate has been applied against a column in the table. For example, SELECT * FROM MyTable WHERE MyTable.MyScalarintegerCol=3. Since the MyScalarintegerCol has had statistics collected on it, then the optimizer pulls the relevant histogram out of the DD. Then optimizer uses the histogram's Application Programming Interface (API) to query the histogram for the expected number of rows having a MyScalarintegerCol value of 3. Thus, the optimizer is able to predict the number of rows that will be returned before even running the actual query against the database.

With this background on the approach used for collecting scalar statistics and for a database optimizer, a discussion of the novel techniques for collecting statistics and using those statistics by a database optimizer is presented in detail with reference to the FIGS. 1A-1E and 2-4.

Spatial Statistics are collected either directly on spatial columns or on R-Tree indexes. Additionally, if an R-Tree index is available on the same target spatial column for which statistics are desired, then the techniques described herein describe an efficient approach for collecting those statistics.

As in the case for collecting statistics on scalar columns, the collection of statistics is driven by the same DDL statement used to drive the collection of scalar statistics, "COLLECT STATISTICS ON MyTable COLUMN MySpatialCol". After resolving, the RDBMS logic knows it is collecting statistics on a spatial column (based on the spatial data type associated with MyTable COLUMN, and thus it can take the appropriate action to employ the processing techniques described herein and below.

Collecting Spatial Statistics in the Presence of an R-Tree Index on the Same Column:

In a distributed database environment such as Teradata® (distributed by Teradata, Inc.), the R-Tree is implemented in a manner akin to a Non-Unique Secondary Index on a scalar column. Each AMP has its own local indexing structure that contains entries corresponding to those table data rows contained solely on that AMP. Thus in the example Teradata® configuration presented above, each AMP has an R-Tree index including 1000 entries each.

The design of an R-Tree is built around the concept of a MBR, such that all spatial objects can be approximated by an MBR that encloses each spatial object. The topmost level of an R-Tree can be represented by a single MBR that encloses all the spatial objects that the R-Tree includes. Thus given the 100 AMP Teradata example, in which each AMP has its own local R-Tree, each of these 100 R-Tree instances can individually be represented by an MBR corresponding to that R-Tree instance.

The collecting of statistics on a spatial data type column utilizes three-phase processing described in the FIGS. 1B-1E. Assuming that the SQL user has created an R-Tree index on the same target spatial column, statistical collection on that spatial column proceed as follows (and as diagrammed in the FIGS. 1B-1E):

1) Phase 1 of Spatial Statistical Collection: A COLLECT STATISTICS message is broadcast to all AMPS to begin the processing.
   a. A single AMP is then selected to collect/retrieve the topmost level AMP-Local R-Tree MBR from each AMP, in which that MBR represents the spatial objects stored on that local AMP. These AMP-Local MBRs are then merged into a single MBR, called the System-wide MBR, which represents all of the spatial data stored on the system at that table/column position.
   b. Once the System-wide MBR has been formed, it is then subdivided into a grid containing N equally sized cells. Where "N" can be a configurable parameter. For the purposes of an example discussion, N is equal to 100. So the MBR is subdivided into 100 equally sized cells.
   c. The cells are then numbered, starting with the number 1, from right to left and from top to bottom. So, following the example, there are 100 cells numbered from 1 to 100. Each of these cells is then represented by an MBR that defines the boundary of the cell.
   d. This collection of cells, along with the cell number and Grid MBR representing each cell, is then packaged up into a special data structure referred to as a Spatial Statistical Context Block (SSCB)(shown in the FIG. 1A and referenced in the FIGS. 1C and 1E), which is then broadcast back out to all AMPs.
2) Phase 2 of Spatial Statistical Collection: Once the AMPs have received the broadcasted SSCB, each individual AMP begins reading rows from its local portion of the target table. Each AMP examines the target spatial column in each row, formulates an MBR to represent that logic. Then using this MBR it fills in the AMP-Local SSCB as follows:
   a. For each SSCB grid MBR that: lies completely within the MBR representing the spatial object in the row being processed, the statistical frequency distinct count for that SCCB grid MBR is incremented by 1.

b. For each SSCB grid MBR that: touches, encloses, and/or intersects the MBR representing the spatial object in the row being processed, the statistical frequency intersect count for every SSCB grid that the MBR interacts with is incremented by 1.

c. Operation is repeated for every row of the local table.

3) Phase 3 of Spatial Statistical Collection: Once the individual AMP-Local SSCB's have been populated by the AMPs, a single AMP then collects all the AMP-Local SSCBs and combines them into a single System-wide SSCB representing all the statistical data collected on that TargetTable.TargetColumn. This System-wide SSCB is then stored away in the DD.

Collecting Spatial Statistics when No Corresponding R-Tree Index on the Same Column is Available:

The difference in the case of no R-Tree index being available, from that which was discussed when an R-Tree index was available, occurs in Phase 1 processing. For this scenario, Phase 1 is described as follows:

1) Phase 1 of Spatial Statistical Collection: A COLLECT STATISTICS message is broadcast to all AMPS to begin the processing.

a. Since there is no R-Tree available. Each AMP must read all the rows from the target table and formulate an AMP-Local MBR representing all spatial data stored in that target table/target column on that AMP.

b. A single AMP then collects/retrieves these AMP-Local MBRs from each AMP and merges them into a single MBR, called the System-wide MBR, which represents all of the spatial data stored on the system at that table/column position.

c. Once the System-wide MBR has been formed, it is then subdivided into a grid containing N equally sized cells. Where "N" can be a configurable parameter. In the present example, N is equal to 100. So, the MBR is subdivided into 100 equally sized cells.

d. The cells are then numbered, starting with the number 1, from right to left and from top to bottom. So, following the example, there are 100 cells numbered from 1 to 100. Each of these cells is then represented by a Grid MBR that defines the boundary of the cell.

e. This collection of cells, along with the cell number and Grid MBR representing each cell, is then packaged up into an SSCB and is then broadcast back out to all AMPs.

2) Phase 2: Same as R-Tree scenario.

3) Phase 3: Same as R-Tree scenario.

Usage of Spatial Statistics by the Optimizer:

In an example scenario, consider that the optimizer wants to calculate the number of rows remaining in a particular table after some spatial predicate has been applied against a column in the table. For example, SELECT * FROM MyTable WHERE MyTable.MySpatialCol.ST_Within(new ST_Geometry('MULTIPOINT(1 2, 3 4, 5 6, 7 8)', 4))). Since the MySpatialCol has had statistics collected on it, then the optimizer pulls the relevant System-wide SSCB out of the dictionary. The literal Multipoint polygon, "new ST_Geometry ('MULTIPOINT(1 2, 3 4, 5 6, 7 8)', 4))", is converted to a representative MBR. Then, the optimizer passes the MBR into the SSCB's API and gets back a row count for the number of rows that may meet the predicate condition. Inside the API, the target MBR is compared against the grid MBRs within the SSCB. The API adds together the frequency counts of any of the grid MBRs that interact with the target MBR, producing the row count estimate. In an embodiment, the API firstly adds together the frequency distinct counts of any of the grid MBR's that interact with the target MBR producing an intermediate result. In this embodiment, it secondly determines the MAX(intersect Count) amongst all SSCB grids with which the target MBR interacts. Then in this embodiment, it takes these maximum values and adds them to the intermediate result, producing the row count estimate. Thus, once again the optimizer is able to predict the number of rows that will be returned before even running the query and this is achieved against spatial column data and/or an R-Tree index.

The techniques described herein enable statistics to be collected on spatial columns. The collected statistics can then be used by an optimizer to estimate the number of rows returned by a query.

Moreover the presented techniques enable statistics to be collected on an R-Tree Index. The collected statistics can then be used by the optimizer to estimate the number of rows returned by a query.

Supplying the Optimizer with the capability of predicting row counts leads to a superior query solving solution, which outperforms query plans formulated with no statistics. This is done for spatial data in the manners described herein above and below.

Figure 2:
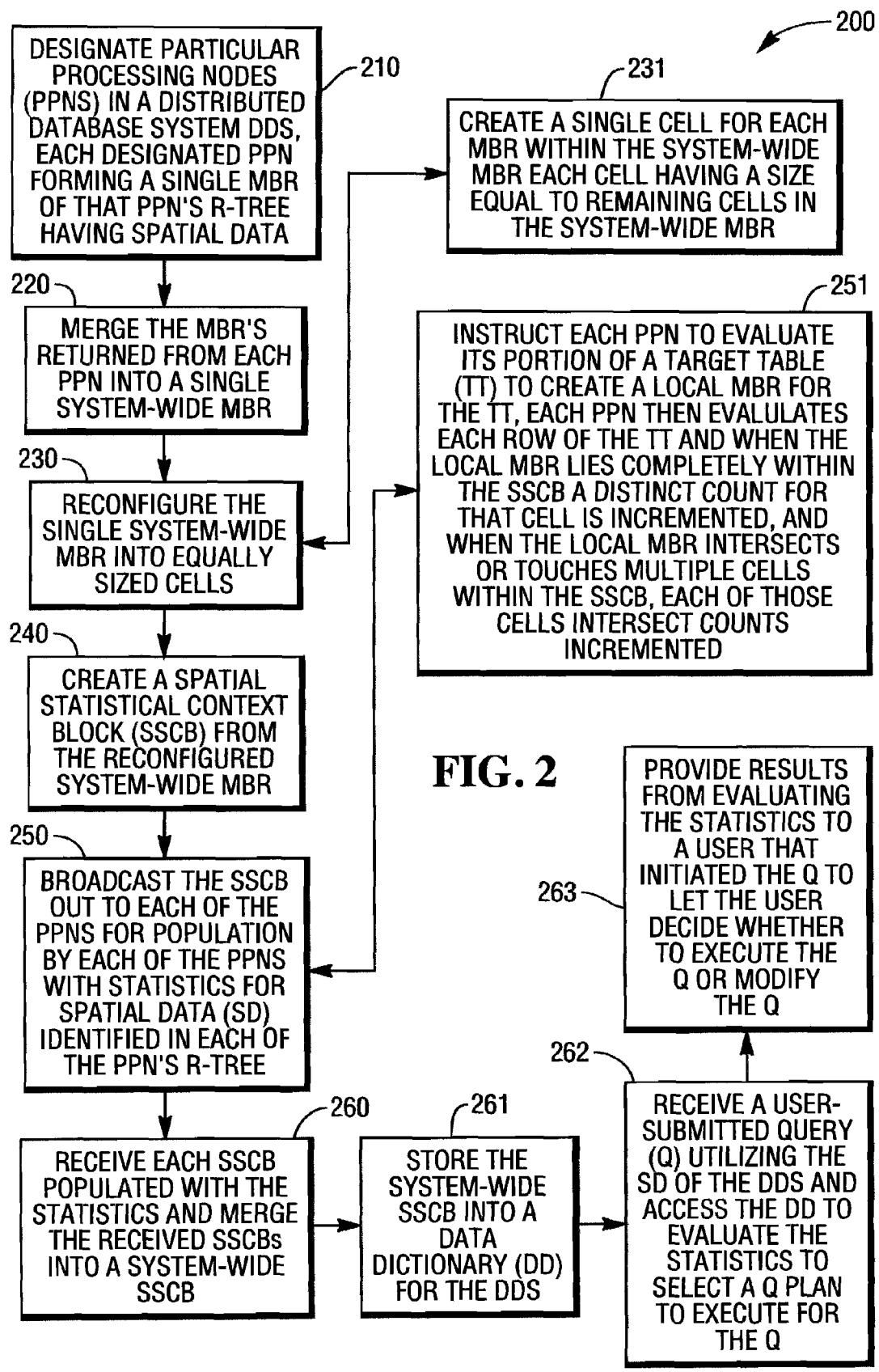
FIG. 2 is a diagram of a method for collecting statistics on an R-Tree index, according to an example embodiment.

FIG. 2 is a diagram of a method 200 for collecting statistics on an R-Tree index, according to an example embodiment. The method 200 (hereinafter "R-Tree statistics collector") is implemented as instructions within a computer-readable storage medium that execute on a plurality of processors, the processors specifically configured to execute the R-Tree statistics collector. Moreover, the R-Tree statistics collector is programmed within a non-transitory computer-readable storage medium. The R-Tree statistics collector may also be operational over a network; the network is wired, wireless, or a combination of wired and wireless.

At 210, the R-Tree statistics collector designates particular processing nodes in a distributed database system (DDS). Each designated particular processing node forms a single MBR of that particular processing node's R-Tree having spatial data. That is, the DDS includes a plurality of processing nodes, such as AMP's discussed above; these processing nodes are capable of processing in parallel with one another and manage portions of the DDS. Here, the processing nodes evaluate their existing R-Trees and establish a single MBR for each R-Tree. A discussion of this was also presented above.

At 220, the R-Tree statistics collector merges the MBRs returned from each particular processing node into a single system-wide MBR. In other words, all the locally created MBRs (created from R-Trees at each processing node) are merged into one system-wide MBR.

At 230, the R-Tree statistics collector reconfigures the single system-wide MBR into equally sized cells. That is, a grid is established from the system-wide MBR.

According to an embodiment, at 231, the R-Tree statistics collector creates a single cell for each MBR (received from the processing nodes) within the system-wide MBR, each cell having a size equal to remaining cells in the system-wide MBR.

At 240, the R-Tree statistics collector creates a spatial statistics context block (SSCB) from the reconfigured system-wide MBR. This is the reformatted system-wide MBR represented as a grid having a cell for all the MBR's returned from the processing nodes and each cell equal sized with other cells in the SSCB. Discussion of the SSCB was presented above with respect to the FIGS. 1A-1E.

At 250, the R-Tree statistics collector broadcasts the SSCB out to each of the particular processing nodes for population by each of the particular processing nodes with statistics for spatial data identified in each of the particular processing nodes of the DDS. That is, each particular processing node receives its own copy or replica of the SSCB that is broadcast out by the R-Tree statistics collector to all the processing nodes.

In an embodiment, at 251, the R-Tree statistics collector instructs each particular processing node to evaluate its portion of a target table for purposes of creating a local MBR for the target table. Each particular processing node then evaluates each row of the target table and when the local MBR lies completely within the SSCB, a distinct count for the cell affected is incremented; and when the local MBR intersects or touches multiple cells within the SSCB, each of those cells have their intersect count incremented. Examples of this were presented above with reference to the discussions of the FIG. 1A-1E.

According to an embodiment, at 260, the R-Tree statistics collector receives each SSCB populated with the statistics and then merges the received SSCBs into a system-wide SSCB.

Continuing with the embodiment of 260 and at 261, the R-Tree statistics collector stores the system-wide SSCB into a DD for the DDS.

Still expanding on the embodiment of 261 and at 262, the R-Tree statistics collector receives a user-submitted query that utilizes the spatial data of the DDS. In response, the R-Tree statistics collector accesses the DD to evaluate the statistics for purposes of selecting a query plan to execute for the query.

Continuing with the embodiment of 262 and at 263, the R-Tree statistics collector provides the results from evaluating the statistics to a user that initiated the query to let the user decide whether to execute the query or modify the query.

Figure 3:
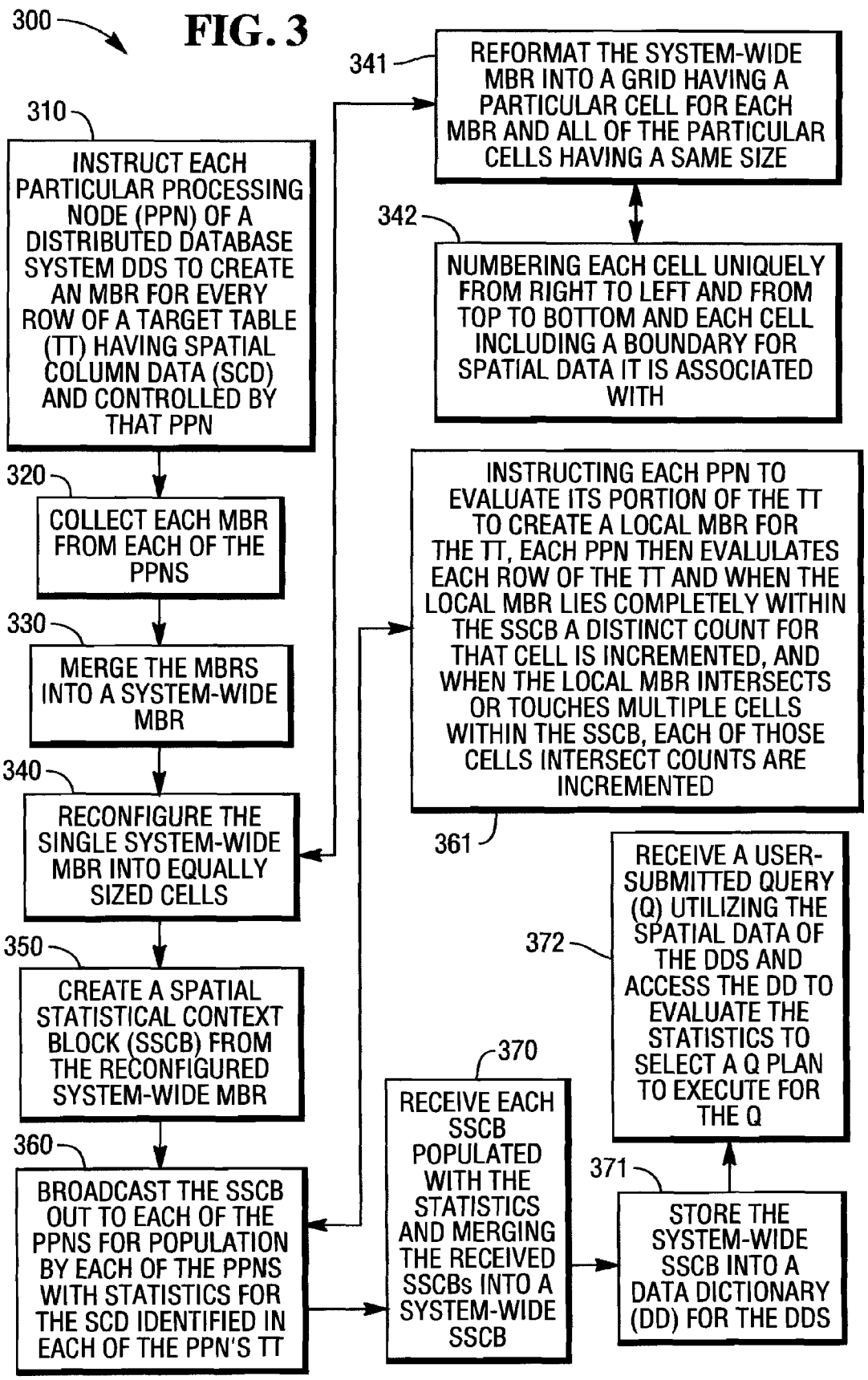
FIG. 3 is a diagram of another method for collecting statistics on spatial column data, according to an example embodiment.

FIG. 3 is a diagram of another method 300 for collecting statistics on spatial column data, according to an example embodiment. The method 300 (hereinafter "spatial column data statistics collector") is implemented as instructions within a computer-readable storage medium that execute on a plurality of processors, the processors specifically configured to execute the spatial column data statistics collector. Moreover, the spatial column data statistics collector is programmed within a non-transitory computer-readable storage medium. The spatial column data statistics collector may also be operational over a network; the network is wired, wireless, or a combination of wired and wireless.

The spatial column data statistics collector presents the processing associated with collecting statistics for spatial column data, whereas the R-Tree statistics collector (represented by the method 200 of the FIG. 2) is associated with collecting statistics for an R-Tree index.

At 310, the spatial column data statistics collector instructs each particular processing node of a DDS to create an MBR for every row of a target table, which has spatial column data controlled by that particular processing node. In this situation, there is no existing R-Tree at each node of the DDS although there is spatial column data.

In fact, processing for the spatial column data statistics collector is similar to what was discussed above with respect to the FIG. 2 except that with processing of the spatial column data statistics collector there is no R-Tree at each of the processing nodes and an MBR must be created from the spatial column data at each node. The remaining processing is similar to that which was presented above with reference to the FIG. 2.

Accordingly, at 320, the spatial column data statistics collector collects each MBR from each of the particular processing nodes.

At 330, the spatial column data statistics collector merges the individual node MBRs into a system-wide MBR.

At 340, the spatial column data statistics collector reconfigures the single system-wide MBR into equally sized cells.

According to an embodiment, at 341, the spatial column data statistics collector reformats the system-wide MBR into a grid having a particular cell for each MBR and all of the particular cells having a same size.

Continuing with the embodiment of 341 at 342, the spatial column data statistics collector numbers each cell uniquely from right to left and from top to bottom; each cell including a boundary for spatial data it is associated with.

At 350, the spatial column data statistics collector creates a spatial statistical context block (SSCB) from the reconfigured system-wide MBR.

At 360, the spatial column data statistics collector broadcast the SSCB out to each of the particular processing nodes for individual population by each of the particular processing nodes with statistics for the spatial column data identified in each particular processing node's target table.

In an embodiment, at 361, the spatial column data statistics collector instructs each particular processing node to evaluate its portion of the target table to create a local MBR for the target table. Each particular processing node evaluates each row of the target table so that when the local MBR lies completely within the SSCB a distinct count for that affected cell is incremented and when the local MBR touches or intersects multiple cells within the SSCB, each of those affected cells have their intersect counts incremented.

According to an embodiment, at 370, spatial column data statistics collector receives each SSCB populated with the statistics and merges the received SSCBs into a system-wide SSCB.

Continuing with the embodiment of 370 and at 371, the spatial column data statistics collector stores the system-wide SSCB into a DD for the DDS.

Still continuing with the embodiment of 371 and at 372, the spatial column data statistics collector receives a user-submitted query that utilizes the spatial data of the DDS and accesses the DD to evaluate the statistics to select a query plan to execute for the query.

Figure 4:
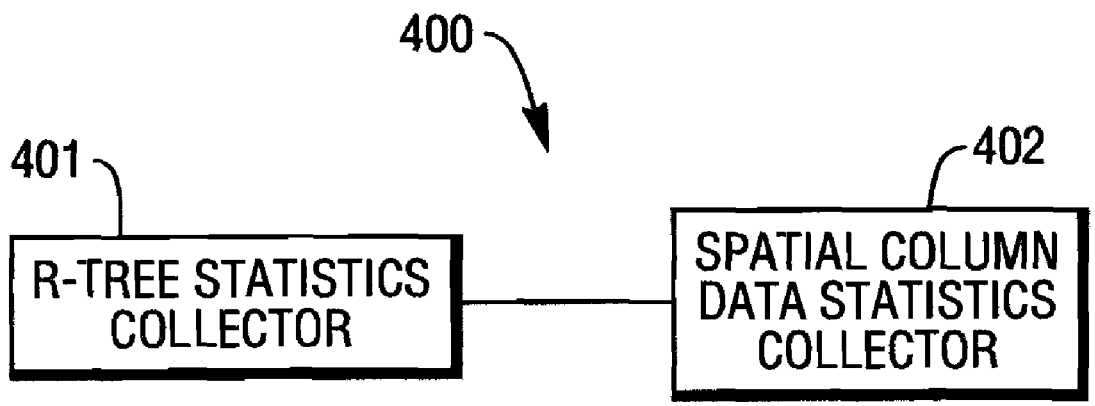
FIG. 4 is a diagram of an R-Tree index and column data statistic collection system, according to an example embodiment.

FIG. 4 is a diagram of an R-Tree index and column data statistic collection system 400, according to an example embodiment. The R-Tree index and column data statistic collection system 400 is implemented, resides, and is programmed within a non-transitory computer-readable storage medium and executes on one or more processors specifically configured to execute the components of the R-Tree index and column data statistic collection system 400. Moreover, the R-Tree index and column data statistic collection system 400 may be operational over a network and the network is wired, wireless, or a combination of wired and wireless.

The R-Tree index and column data statistic collection system 400 implements, inter alia, the techniques presented and described above with reference to the FIGS. 1A-1E and FIGS. 2-3.

The R-Tree index and column data statistic collection system 400 includes an R-Tree statistics collector 401 and a spatial column data statistics collector. Each of these and their interactions with one another will now be discussed in turn.

The R-Tree statistics collector 401 is programmed within a non-transitory computer-readable medium and executes on a processor. The processor specifically configured to execute the R-Tree statistics collector 401. Example aspects of the R-Tree statistics collector 401 were presented above with reference to the FIGS. 1A-1E and FIG. 2.

The R-Tree statistics collector 401 is configured to formulate a SSCB from first MBR's representing local R-Trees. Each first MBR and each R-tree controlled by a first processing node in a distributed database system. The R-Tree statistics collector 401 also configured to instruct each first processing node to update cells of the SSCB based on evaluation of each first processing node's R-Tree for a target table.

According to an embodiment, the R-Tree statistics collector 400 is configured to create a total number of cells in the SSCB that is equal to a total number of MBR's and each cell in the SSCB uniquely numbered and reconfigured to have a same size as remaining ones of the SSCB.

The spatial column data statistics collector 402 is programmed within a non-transitory computer-readable medium and executes on the processor. The processor is specifically configured to execute the spatial column data statistics collector 402.

The spatial column data statistics collector 402 is configured to instruct second processing nodes not having a local R-Tree to create local MBR's for the target table. The spatial column data statistics collector is also configured to create a second SSCB from the local MBR's and instructs each of these second processing nodes to update cells of the second SSCB in view of the second SSCB and the target table having spatial column data.

According to an embodiment, spatial column data statistics collector 402 is also configured to create a total number of cells in the second SSCB that is equal to a total number of local MBR's and each cell in the second SSCB uniquely numbered and reconfigured to have a same size as remaining ones of the second SSCB.

In an embodiment, the SSCB and the second SSCB are configured to be accessible via a DD of the DDS for access by a query optimizer. The query optimizer is configured to use the SSCB and the second SSCB to create query execution plans for queries requesting evaluation of spatial data. Also, the query optimizer is configured to interact with users to confirm execution of the queries based on the created query execution plans.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:

designating, via the processor, particular processing nodes in a distributed database system, each designated processing node forming a single minimum bounding rectangle of that designated processing node's MBR Tree (R-Tree) having spatial data;

merging, via the processor, the MBR's returned from each particular processing node into a single system-wide MBR;

reconfiguring, via the processor, the single system-wide MBR into equally sized cells;

creating, via the processor, a spatial statistical context block (SSCB) from the reconfigured system-wide MBR; and broadcasting, via the processor, the SSCB out to each of the particular processing nodes for population by each of the particular processing nodes with statistics for spatial data identified in each of the particular processing node's R-Tree.

2. The method of claim 1 further comprising, receiving, via the processor, each SSCB populated with the statistics and merging the received SSCBs into a system-wide SSCB.

3. The method of claim 2 further comprising, storing, via the processor, the system-wide SSCB into a data dictionary for the distributed database system.

4. The method of claim 3 further comprising, receiving, via the processor, a user-submitted query utilizing the spatial data of the distributed database system and accessing the data dictionary to evaluate the statistics to select a query plan to execute for the query.

5. The method of claim 4 further comprising, providing, via the processor, results from evaluating the statistics to a user that initiated the query to let the user decide whether to execute the query or modify the query.

6. The method of claim 1, wherein reconfiguring further includes creating a single cell for each MBR within the system-wide MBR each cell having a size equal to remaining cells in the system-wide MBR.

7. The method of claim 1, wherein broadcasting further includes instructing each particular processing node to evaluate its portion of a target table to create a local MBR for the target table, each particular processing node then evaluates each row of the target table and when the local MBR lies completely within the SSCB a distinct count for that cell is incremented, and when the local MBR intersects or touches multiple cells within the SSCB, each of those cells are intersect counts are incremented.

8. A method implemented and programmed within a non-transitory computer-readable storage medium and processed by a processor, the processor configured to execute the method, comprising:

instructing, via the processor, each particular processing node of a distributed database system to create a minimum bounding rectangle (MBR) for every row of a target table having spatial column data and controlled by that particular processing node;

collecting, via the processor, each MBR from each of the particular processing nodes;

merging, via the processor, the MBRs into a system-wide MBR;

reconfiguring, via the processor, the single system-wide MBR into equally sized cells;

creating, via the processor, a spatial statistical context block (SSCB) from the reconfigured system-wide MBR; and broadcasting, via the processor, the SSCB out to each of the particular processing nodes for population by each of the particular processing nodes with statistics for the spatial column data identified in each of the particular processing node's target table.

9. The method of claim 8 further comprising, receiving, via the processor, each SSCB populated with the statistics and merging the received SSCBs into a system-wide SSCB.

10. The method of claim 9 further comprising, storing, via the processor, the system-wide SSCB into a data dictionary for the distributed database system.

11. The method of claim 10 further comprising, receiving, via the processor, a user-submitted query utilizing the spatial data of the distributed database system and accessing the data dictionary to evaluate the statistics to select a query plan to execute for the query.

12. The method of claim 8, wherein reconfiguring further includes reformatting the system-wide MBR into a grid having a particular cell for each MBR and all of the particular cells having a same size.

13. The method of claim 12, wherein reformatting further includes numbering each cell uniquely from right to left and from top to bottom and each cell including a boundary for spatial data it is associated with.

14. The method of claim 8, wherein broadcasting further includes instructing each particular processing node to evaluate its portion of the target table to create a local MBR for the target table, each particular processing node then evaluates each row of the target table and when the local MBR lies completely within the SSCB a distinct count for that cell is incremented, and when the local MBR intersects or touches multiple cells within the SSCB, each of those cells intersect counts are incremented.

15. A processor-implemented system, comprising:
 a minimum bounding rectangle (MBR) Tree (R-Tree) statistics collector programmed within a non-transitory computer-readable medium and to execute on a processor; and
 a spatial column data statistics collector programmed within a non-transitory computer-readable medium and to execute on the processor;
 the R-Tree statistics collector configured to formulate a spatial statistics context block (SSCB) from first MBR's representing local R-Trees, each first MBR and each R-tree controlled by a first processing node in a distributed database system, the R-Tree statistics collector also configured to instruct each first processing node to update cells of the SSCB based on evaluation of each first processing node's R-Tree for a target table, the spatial column data statistics collector is configured to instruct second processing nodes not having a local R-Tree to create local MBR's for the target table, the spatial column data statistics collector also configured to create a second SSCB from the local MBR's and instruct each of these second processing nodes to update cells of the second SSCB in view of the second SSCB and the target table having spatial column data.

16. The system of claim 15, wherein the SSCB and the second SSCB are configured to be accessible via a data dictionary of the distributed database system for access by a query optimizer.

17. The system of claim 16, wherein the query optimizer is configured to use the SSCB and the second SSCB to create query execution plans for queries requesting evaluation of spatial data.

18. The system of claim 17, wherein the query optimizer is configured to interact with users to confirm execution of the queries based on the created query execution plans.

19. The system of claim 15, wherein the spatial column data statistics collector is configured to create a total number of cells in the second SSCB that is equal to a total number of local MBR's and each cell in the second SSCB uniquely numbered and reconfigured to have a same size as remaining ones of the second SSCB.

20. The system of claim 15, wherein the R-Tree statistics collector is configured to create a total number of cells in the SSCB that is equal to a total number of MBR's and each cell in the SSCB uniquely numbered and reconfigured to have a same size as remaining ones of the SSCB.

* * * * *